United States Patent [19]

Asakawa et al.

[11] Patent Number: 5,256,210

[45] Date of Patent: Oct. 26, 1993

[54] STRIPPING COMPOSITION FOR RESIN PAINT MATERIAL AND A METHOD OF REMOVING RESIN PAINT MATERIALS

[75] Inventors: Kaoru Asakawa; Atsushi Kato; Hiroki Nagayama, all of Yokosuka, Japan

[73] Assignee: Nissan Motor Co., Ltd., Japan

[21] Appl. No.: 856,794

[22] Filed: Mar. 24, 1992

[30] Foreign Application Priority Data

| | | |
|---|---|---|
| Mar. 25, 1991 [JP] | Japan | 3-83009 |
| Mar. 25, 1991 [JP] | Japan | 3-84643 |
| Jul. 1, 1991 [JP] | Japan | 3-185833 |
| Jul. 1, 1991 [JP] | Japan | 3-185834 |
| Jul. 1, 1991 [JP] | Japan | 3-185835 |

[51] Int. Cl.$^5$ ............... B08B 7/00; C23D 17/00; C11D 1/18; C11D 7/50
[52] U.S. Cl. .................. 134/38; 134/42; 252/146; 252/153; 252/171; 252/143
[58] Field of Search ............ 252/146, 153, 171, 143; 134/38, 42

[56] References Cited

U.S. PATENT DOCUMENTS

| | | | |
|---|---|---|---|
| 3,458,445 | 7/1969 | Macriss et al. | 252/67 |
| 4,369,134 | 1/1983 | Deguchi et al. | 252/526 |
| 4,427,571 | 1/1984 | Parker et al. | 252/364 |
| 4,637,899 | 1/1987 | Kennedy, Jr. | 252/542 |

FOREIGN PATENT DOCUMENTS

2-286795 11/1990 Japan .
2-286796 11/1990 Japan .

*Primary Examiner*—Paul Lieberman
*Assistant Examiner*—Michael Tierney
*Attorney, Agent, or Firm*—Lowe, Price, LeBlanc & Becker

[57] ABSTRACT

A stripping composition comprises particular amounts of thiocyanate, alcohol and water, and is sprayed or applied onto a resin parts coated with a resin paint or immersed therewith to efficiently remove a resin paint material therefrom without degradation of environment hygiene and breakage of ozone layer.

4 Claims, No Drawings

STRIPPING COMPOSITION FOR RESIN PAINT MATERIAL AND A METHOD OF REMOVING RESIN PAINT MATERIALS

BACKGROUND OF THE INVENTION

1. Field of the Invention

This invention relates to a stripping composition for resin paint material having an excellent handling property without causing breakage of ozone layer and the like.

2. Disclosure of the Related Art

It is demanded to develop stripping composition and method for resin paint material having effective film stripping performance, good operability and high environmental safeness at working step for resin painting or preliminary treating step for recycling materials.

As a stripping composition for resin paint material, there have hitherto been proposed a mixed solvent composition of chloropentafluoropropane and 1,1-dichloro-1-fluoroethane (Japanese Patent laid open No. 2-286795), a mixed solvent composition of chloropentafluoropropane and dichlorotrifluoroethane (Japanese Patent laid open No. 2-286796) and the like.

Furthermore, it is well-known to use a halogen series solvent such as methylene chloride or the like, a strong alkali solution or a strong acid solution as the stripping agent.

The mixed solvent compositions described in the above articles are excellent in the detergency to oil and fats and low in the risk of breaking ozone layer, but their application is restricted only to electric parts and the like because the special solvent is used. Furthermore, since these compositions contain many halogen atoms (F, Cl) in their molecules, a care should be taken of the handling in view of environment hygiene. On the other hand, the use of the halogen series solvent badly affects environment hygiene and also causes the breakage of ozone layer. Even in the use of the strong alkali or acid solution, there are caused problems in the operability and environmental safeness, and also it is required to take a complicated post-treating step such as neutralization and the like.

SUMMARY OF THE INVENTION

It is an object of the invention to solve the above problems of the conventional techniques and to provide a novel stripping composition for resin paint material as well as a method of removing resin paint materials by using such a stripping composition.

According to a first aspect of the invention, there is the provision of a stripping composition for resin paint material comprising 8-65% by weight of a thiocyanate represented by the following formula:

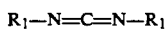

$M(S=C=N)_n$ (wherein M is an alkali metal ion (Group 1A), an alkaline earth metal ion (Group 2A) or a quaternary ammonium ion having an ionic value of n), 10-85% by weight of an alcohol having a boiling point under atmospheric pressure of not higher than 100° C., and 5-60% by weight of water.

In a preferred embodiment, the stripping composition comprises 10-40% by weight of thiocyanate, 20-60% by weight of alcohol and 10-30% by weight of water.

According to a second aspect of the invention, there is the provision of a method of removing resin paint material, which comprises spraying or applying the stripping composition as defined in the first aspect of the invention to resin parts coated with a resin paint at a temperature of room temperature to 160° C., preferably 50°-100° C., or immersing the resin parts into the stripping composition at this temperature.

DESCRIPTION OF THE PREFERRED EMBODIMENTS

According to the invention, a part of the thiocyanate represented by the formula of $M(S=C=N)n$ may be replaced with a carbodiimide represented by the following formula:

$R_1-N=C=N-R_1$ (wherein $R_1$ is a cyclohexyl group)

In this case, the total amount of thiocyanate and carbodiimide does not exceeds a saturated concentration based on the amount of the alcohol used. In this case, the use of water may be omitted.

As the alcohol used in the invention, mention may be made of a monool represented by the following formula:

$R_2-OH$ (wherein $R_2$ is $C_nH_{2n+1}$ or an aromatic group and n is an integer of 1-10); a diol represented by the following formula:

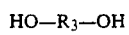

$HO-R_3-OH$ (wherein $R_3$ is $C_nH_{2n}$ or an aromatic group and n is an integer of 2-10); a triol represented by the following formula:

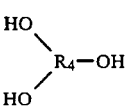

(wherein $R_4$ is $C_6H_{11}$ or $C_7H_{13}$): and a tetraol represented by the following formula:

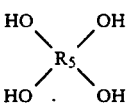

(wherein $R_5$ is $C_nH_{2n+1}$ and n is an integer of 4-5).

Moreover, a part of the alcohol may be replaced with a monocarboxylic acid represented by the following formula:

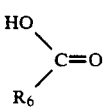

(wherein $R_6$ is $C_nH_{2n+1}$ and n is an integer of 1-10), or a dicarboxylic acid represented by the following formula:

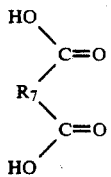

(wherein $R_7$ is $C_nH_{2n}$ and n is an integer of 1-10), or a glycol of $HO(CH_2CH_2O)_nH$ (wherein n is 2 or more), or a thiol represented by the following formulae:

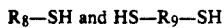

$R_8$—SH and HS—$R_9$—SH (wherein $R_8$ is $C_nH_{2n+1}$ or an aromatic group, $R_9$ is $C_nH_{2n}$ or an aromatic group and n is an integer of 2-10).

Moreover, it has been confirmed that when an amide, a sulfoxide, a ketone or a imine is used together with the alcohol instead of the thiocyanate, similar effect of removing the resin paint material may be obtained likewise the above stripping composition. In this case, the amide is represented by the following formula:

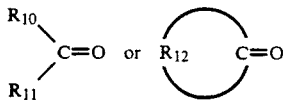

(wherein $R_{10}$ is H or $CH_3$, $R_{11}$ is $NH_2$ or $N(CH_3)_2$, and $R_{12}$ is —$C_3H_6$—N($CH_3$)—, —$C_3H_6$—NH— or —N($CH_3$)—$C_2H_4$—N($CH_3$)—), and the sulfoxide is represented by the following formula:

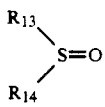

(wherein $R_{13}$ and $R_{14}$ are $C_nH_{2n+1}$ and n is an integer of 1-4), and the ketone is represented by the following formula:

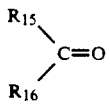

(wherein $R_{15}$ and $R_{16}$ are $C_nH_{2n+1}$ or aromatic group and n is an integer of 1-10), and the imine is represented by the following formula:

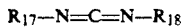

$R_{17}$—N=C=N—$R_{18}$ (wherein $R_{17}$ and $R_{18}$ are $C_6H_{11}$).

In the stripping composition according to the invention, the thiocyanate reacts with a paint resin or formulae to decompose and remove the resin film:

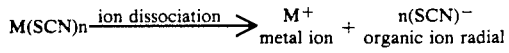

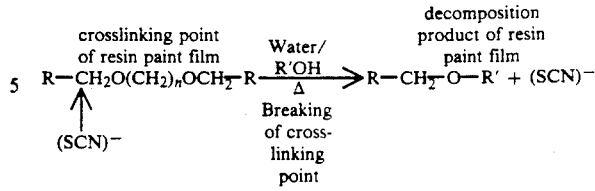

That is, the ether bonding portions of the resin paint material is selectively decomposed by the organic ion radical produced through ion dissociation of the thiocyanate and the alcohol.

Moreover, when a part of the thiocyanate is replaced with the carbodiimide, these compounds react with the alcohol to form an active reaction intermediate, which then reacts with a portion of the paint resin or primer resin having a low pair electron (e.g. nitrogen atom or the like) to finally decompose the resin.

The alcohol used as a solvent for the thiocyanate in the invention is selected from monool, diol, triol and tetraol having 1-4 hydroxy group. The alcohol acts to promote solution wetting property and permeability of the paint resin or swell the resin paint material or primer to promote the diffusion/permeation of the thiocyanate and to solvate ion radical of the thiocyanate. For this end, when the carbon number of the alcohol is too high as in n-dodecanol, the hydroscopicity becomes undesirably high, so that the carbon number is restricted up to about 10.

Water is used as a direct solvent for the thiocyanate and acts to promote the diffusion/permeation of the thiocyanate and solvate ion radical of the thiocyanate likewise the alcohol and to considerably improve the solution wetting property and ion dissociation of the resin paint material.

When the amount of the thiocyanate is less than 8% by weight, the paint resin or primer resin can not sufficiently be decomposed, while when it exceeds 65% by weight, the solubility to the solvent becomes actually impossible.

When the amount of water is less than 5% by weight, the sufficient ion dissociation for removing the resin paint material can not be attained, while when it exceeds 60% by weight, the solution wetting property and the diffusion/permeation of the resin paint material are considerably degraded and also the thiocyanate is stably solvated to damage the stripping ability for the resin paint material.

When the amount of the alcohol is less than 10% by weight, the solution wetting property and the diffusion/permeation of the resin paint material are considerably degraded, while when it exceeds 85% by weight, the solubility of the thiocyanate lowers and also the thiocyanate is not adequately solvated.

In the removal of the resin paint material with the use of the above stripping composition, when the treating temperature is lower than room temperature, the paint resin or primer resin can not sufficiently be swelled with the alcohol and also the thiocyanate can not sufficiently be diffused or permeated into the paint resin or primer resin. While, when the treating temperature is higher than 160° C., the solvent is evaporated to cause the change of composition and the fusion, thermal degradation and the like of the resin parts and the removing operation becomes difficult, so that the use of the stripping composition is unsuitable for practical use.

The following examples are given in illustration of the invention and are not intended as limitations thereof.

Preparation of a stripping composition for resin paint material,

The thiocyanate, alcohol (liquid) and water were weighed to given amounts by means of an automatic weighing machine at room temperature, respectively, and mixed in a beaker to dissolve the thiocyanate in the alcohol. In the mixing, these components were stirred by means of a magnetic stirrer and the beaker was warmed on a water bath or an oil bath, if necessary, to prepare a stripping composition for resin paint material.

The thus obtained stripping compositions are shown in Table 1 together with their evaluation results for removing resin paint material.

Moreover, the stripping composition may industrially be prepared by utilizing the density of the alcohol to weigh the volume converted into weight.

Evaluation test for removing resin paint material

The above stripping composition was charged into a flask in an adequate amount (about 100 ml) and refluxed to a given temperature (50°-100° C.) with stirring by means of a magnetic stirrer. Into the stripping composition held at the given temperature were immersed 5 test specimens of about 10 mm×about 10 mm×about 5 mm cut out from a resin painted resin part for 45 minutes and then the test specimens were taken out from the stripping composition and left to stand for 15 minutes. Then, the state of removing the resin paint material from the resin part was visually evaluated.

The evaluated results of the stripping compositions are also shown in Table 1.

Moreover, two kinds of the resin painted resin part to be tested (I, II) were used, in which the chemical composition in the paint resin and primer resin were different.

In the column "resin part" of Table 1, mark ⊙ is a case that the solid color resin or primer resin is decomposed, mark ○ is a case that the solid color resin or paint resin is peeled, mark Δ is a case that a part of the resin is partly dissolved or decomposed or swelled, and mark X is a case that the change of the resin is not observed. Moreover, the numerical value in each item indicates the number of the test specimens causing the respective phenomenon along 5 test specimens.

EXAMPLE 1

About 100 ml of the stripping composition for resin paint material (sodium thiocyanate/ethanol/water=45 wt %/22 wt %/33 wt %) was charged into a flask of 200 ml and refluxed to a given temperature on a water bath with stirring by means of a magnetic stirrer. Then, 5 test specimens (10×10×5 mm) of each of the resin parts I and II were immersed in the stripping composition and the state of removing the resin paint material was evaluated in the same manner as described above. The results are shown in Table 1.

EXAMPLES 2-14, COMPARATIVE EXAMPLES 1-10

Each of the stripping compositions shown in Table 1 was used to evaluate the state of removing the resin paint material in the same manner as described above. The results are shown in Table 1.

TABLE 1

| | Stripping composition | | | | State of removing resin paint film | | | | | | | |
|---|---|---|---|---|---|---|---|---|---|---|---|---|
| | | | | | Resin part I[*1] | | | | Resin part II[*1] | | | |
| | Components | Mixing ratio (wt %) | Treating method | Temperature (°C.) | ⊙ | ○ | Δ | X | ⊙ | ○ | Δ | X |
| Example 1 | Sodium thiocyanate/ethanol/water | 45/22/33 | immersion | 50~100 | 5 | | | | 5 | | | |
| 2 | Sodium thiocyanate/ethanol/water | 28/58/14 | immersion | 60~100 | 5 | | | | 5 | | | |
| 3 | Sodium thiocyanate/ethanol/water | 15/77/8 | immersion | 60~100 | 5 | | | | | 5 | | |
| 4 | Sodium thiocyanate/ethanol/water | 34/33/33 | immersion | 50~100 | 5 | | | | 5 | | | |
| 5 | Calcium thiocyanate/ethanol/water | 50/25/25 | immersion | 50~100 | 5 | | | | 5 | | | |
| 6 | Calcium thiocyanate/ethanol/water | 28/58/14 | immersion | 60~100 | 5 | | | | 5 | | | |
| 7 | Calcium thiocyanate/ethanol/water | 15/77/8 | immersion | 60~100 | 5 | | | | | 2 | 3 | |
| 8 | Sodium thiocyanate/n-propyl alcohol/water | 28/58/14 | immersion | 50~100 | 5 | | | | 5 | | | |
| 9 | Calcium thiocyanate/n-propyl alcohol/water | 38/38/24 | immersion | 60~100 | 5 | | | | | 3 | 2 | |
| 10 | Sodium thiocyanate/ethane diol/water | 20/50/30 | immersion | 60~100 | 5 | | | | | 4 | 1 | |
| 11 | Sodium thiocyanate/ethane diol/water | 20/30/50 | immersion | 60~100 | 5 | | | | | 4 | 1 | |
| 12 | Ammonium thiocyanate/ethanol/water | 25/50/25 | immersion | 50~100 | 5 | | | | | 3 | 2 | |
| 13 | Sodium thiocyanate/methanol/water | 50/25/25 | immersion | 50~100 | 5 | | | | | 3 | 2 | |
| 14 | Calcium thiocyanate/methanol/water | 34/33/33 | immersion | 50~100 | 5 | | | | | 3 | 2 | |
| Comparative Example 1 | Water | 100 | immersion | 100 | | | | 5 | | | | 5 |
| 2 | Sodium hydroxide/water | 4/96 | immersion | 100 | | | | 5 | | | | 5 |
| 3 | Sodium thiocyanate/water | 50/50 | immersion | 100 | | | | 5 | | | | 5 |
| 4 | Sodium thiocyanate/ethanol | 5/95 | immersion | 50~80 | | | | 5 | | | | 5 |
| 5 | Sodium thiocyanate/ethanol/water | 5/5/90 | immersion | 80 | | | 1 | 4 | | | 1 | 4 |
| 6 | Sodium thiocyanate/ethanol/water | 8/20/72 | immersion | 60~80 | | | | 5 | | | | 5 |
| 7 | Calcium thiocyanate/ethanol/water | 5/20/75 | immersion | 70 | | | 2 | 3 | | | 1 | 4 |
| 8 | Calcium thiocyanate/ethanol/water | 5/90/5 | immersion | 50~80 | | | 1 | 4 | | | | 5 |
| 9 | Calcium thiocyanate/ethanol/water | 50/25/25 | immersion | 30 | | | | 5 | | | | 5 |
| 10 | Calcium thiocyanate/ethanol/water | 50/25/25 | immersion | 180 | 5[*2] | | | | 5[*2] | | | |

[*1] melamine-acrylic thermosetting resin paint/primer resin/polyolefin resin substrate
The chemical compositions of resin paint and primer resin are different between the resin parts I and II.
[*2] Swelling or partly dissolving of polyolefin resin part

EXAMPLES 15-26, COMPARATIVE EXAMPLES 11-18

Each of the stripping compositions shown in Table 2 was used to evaluate the state of removing the resin paint material in the same manner as described above. The results are shown in Table 2.

TABLE 2

| | Stripping composition | | | Evaluation test | | |
| | Components | Mixing ratio (wt %) | Treating method | Temperature (°C.) | State of removing resin paint film | |
| | | | | | Resin part I[*1] | Resin part II[*1] |
|---|---|---|---|---|---|---|
| Example 15 | Potassium thiocyanate/methanol/water | 28/58/14 | immersion | 60 | ◉ | ○ |
| 16 | Potassium thiocyanate/i-propanol/water | 28/58/14 | immersion | 50~80 | ◉ | ◉ |
| 17 | Ammonium thiocyanate/ethanol/water | 28/58/14 | immersion | 50~80 | ◉ | ◉ |
| 18 | Calcium thiocyanate/ethanol/water | 28/58/14 | immersion | 50~80 | ◉ | ◉ |
| 19 | Zinc thiocyanate/ethanol/water | 28/58/14 | immersion | 50~80 | ◉ | ◉ |
| 20 | Potassium thiocyanate/n-octyl alcohol/ethanol/water | 28/19/39/14 | immersion | 50~80 | ◉ | ○ |
| 21 | Potassium thiocyanate/pentaerylthritol/ethanol/water | 28/19/39/14 | immersion | 50~100 | ◉ | ◉ |
| 22 | Potassium thiocyanate/ethane thiol/water | 28/58/14 | immersion | 50 | ◉ | ○ |
| 23 | Potassium thiocyanate/ethanol/water | 28/54/14 | immersion | 50~80 | ◉ | ○ |
| 24 | Potassium thiocyanate/acetic acid/water | 28/54/14 | immersion | 50~100 | ○ | ○ |
| 25 | Potassium thiocyanate/ethanol/polyethylene glycol/water | 28/39/19/14 | immersion | 50~80 | ◉ | ○ |
| 26 | Dicyclohexyl carbodiimide/ethanol | 20/80 | immersion | 50~80 | ◉ | ◉ |
| Comparative Example 11 | Water | 100 | immersion | 100 | X | X |
| 12 | Potassium hydroxide/water | 4/96 | immersion | 100 | X | X |
| 13 | Potassium thiocyanate/water | 40/60 | immersion | 100 | X | X |
| 14 | Potassium thiocyanate/dimethylformamide | 20/80 | immersion | 50~100 | X | X |
| 15 | Potassium thiocyanate/ethanol | 2/98 | immersion | 80 | X | X |
| 16 | Potassium thiocyanate/ethanol | 50/50 | immersion | 23 | X | X |
| 17 | Potassium thiocyanate/n-dodecanol | 10/90 | immersion | 100 | Δ | Δ |
| 18 | Potassium thiocyanate/n-dodecanol | 10/90 | immersion | 160 | Δ[*2] | Δ[*2] |

[*1]melamine-acrylic thermosetting resin paint/primer resin/polyolefin resin substrate
The chemical compositions of resin paint and primer resin are different between the resin parts I and II.
[2]Swelling or partly dissolving of polyolefin resin part

EXAMPLES 27–62, COMPARATIVE EXAMPLES 19–32

Each of the stripping compositions shown in Table 3 was used to evaluate the state of removing the resin paint material in the same manner as described above. The results are shown in Table 3.

TABLE 3

| | Stripping composition | | | Evaluation test | | |
| | Components | Mixing ratio (wt %) | Treating method | Temperature (°C.) | State of removing resin paint film | |
| | | | | | Resin part I[*1] | Resin part II[*1] |
|---|---|---|---|---|---|---|
| Example 27 | Dimethylformamide/ethanol | 50/50 | immersion, steam | 50~100 | ◉ | ◉ |
| 28 | Dimethylformamide/methanol | 50/50 | immersion | 50~80 | ◉ | ○ |
| 29 | Dimethylformamide/ethanol | 20/80 | immersion | 50~80 | ◉ | ◉ |
| 30 | Dimethylformamide/ethanol | 80/20 | immersion | 50~100 | ◉ | ◉ |
| 31 | Dimethylformamide/isopropyl alcohol | 50/50 | immerision | 50~150 | ◉ | ◉ |
| 32 | Dimethylformamide/n-octyl alcohol | 50/50 | immersion | 50~150 | ◉ | ◉ |
| 33 | Dimethylformamide/n-decanol | 50/50 | immersion | 50~150 | ◉ | ○ |
| 34 | Dimethylformamide/ethyl thiol | 50/50 | immersion | 50~70 | ◉ | ◉ |
| 35 | Dimethylformamide/ethylene diol | 50/50 | immersion | 50~100 | ◉ | ◉ |
| 36 | Dimethylformamide/n-decamethylene diol | 50/50 | immerison | 50~150 | ◉ | ◉ |
| 37 | Dimethylformamide/pentaerythritol | 70/30 | immersion | 50~100 | ◉ | ◉ |
| 38 | Dimethylformamide/ethylene glycol | 50/50 | immersion | 50~150 | ◉ | ○ |
| 39 | Formamide/ethanol | 50/50 | immersion | 50~100 | ◉ | ◉ |
| 40 | N-methyl pyrolidone/ethanol | 50/50 | immersion | 50~150 | ◉ | ◉ |
| 41 | Dimethylsulfoxide/ethanol | 50/50 | immersion | 50~100 | ◉ | ◉ |
| 42 | Methyl ethyl ketone/ethanol | 50/50 | immersion | 50~70 | ◉ | ◉ |
| 43 | Acetophenone/ethanol | 50/50 | immersion | 50~100 | ◉ | ◉ |
| 44 | N,N-dimethylformamide/ethanol | 10/90 | immersion, steam | 50~100 | ◉ | ◉~○ |
| 45 | N,N-dimethylformamide/ethanol | 90/10 | immersion | 50~80 | ◉ | ◉ |
| 46 | N,N-dimethylformamide/methanol | 10/90 | immersion | 50~80 | ◉ | ◉~○ |
| 47 | N,N-dimethylformamide/methanol | 90/10 | immersion | 50~80 | ◉ | ◉~○ |
| 48 | N,N-dimethylformamide/isopropyl alcohol | 10/90 | immersion | 50~150 | ◉ | ◉~○ |
| 49 | N,N-dimethylformamdie/isopropyl alcohol | 90/10 | immersion | 50~150 | ◉ | ◉ |
| 50 | N,N-dimethylformamide/n-octyl alcohol | 10/90 | immersion | 50~150 | ◉ | ◉~○ |
| 51 | N,N-dimethylformamide/n-octyl alcohol | 90/10 | immersion | 50~150 | ◉ | ◉~○ |
| 52 | N,N-dimethylformamide/isopropanol | 50/50 | immersion | 50~150 | ◉ | ◉~○ |
| Example 53 | N,N-dimethylformamide/thiophenol | 50/50 | immersion | 50~100 | ◉ | ◉ |
| 54 | Dimethylsulfoxide/ethanol | 10/90 | immersion | 50~100 | ◉ | ◉~○ |
| 55 | Dimethylsulfoxide/ethanol | 90/10 | immersion | 50~100 | ◉ | ◉ |
| 56 | 1,3-dimethyl-2-imidazolidinone/ethanol | 10/90 | immersion | 50~100 | ◉ | ◉~○ |
| 57 | 1,3-dimethyl-2-imidazolidinone/ethanol | 50/50 | immersion | 50~100 | ◉ | ◉ |
| 58 | 1,3-dimethyl-2-imidazolidinone/ethanol | 90/10 | immersion | 50~100 | ◉ | ◉~○ |

TABLE 3-continued

| | Stripping composition | | | Evaluation test | | |
|---|---|---|---|---|---|---|
| | | | | | State of removing resin paint film | |
| | Components | Mixing ratio (wt %) | Treating method | Temperature (°C.) | Resin part I*1 | Resin part II*1 |
| | 59 1,3-dimethyl-2-imidazolidinone/isopropanol | 50/50 | immersion | 50~150 | ⊚ | ⊚~○ |
| | 60 1,3-dimethyl-2-imidazolidinone/isopropyl alcohol | 50/50 | immersion | 50~150 | ⊚ | ⊚~○ |
| | 61 N,N'-dicyclohexylcarbodiimide/ethanol | 50/50 | immersion | 50~100 | ⊚ | ⊚ |
| | 62 Methyl ethyl ketone/ethanol | 80/20 | immersion | 50~80 | ⊚ | ⊚ |
| Comparative Example 19 | Water | 100 | immersion | 100 | X | X |
| | 20 Potassium hydroxide/water | 4/96 | immersion | 100 | X | X |
| | 21 Ethanol | 100 | immersion | 50~75 | ⊚ | X |
| | 22 Potassium hydroxide/ethanol | 4/96 | immersion | 80 | ⊚ | X |
| | 23 Dimethylformamide | 100 | immersion | 50~100 | Δ~○ | ⊚ |
| | 24 Dimethylsulfoxide | 100 | immersion | 50~100 | Δ | ○ |
| | 25 Dimethylformamide/ethanol | 1/99 | immersion | 50~100 | ⊚ | X |
| | 26 Dimethylformamide/ethanol | 50/50 | immersion | 23 | X | X |
| | 27 Dimethylformamide/n-octyl alcohol | 50/50 | immersion | 160 | ⊚*2 | ⊚*2 |
| | 28 n-dodecanol | 100 | immersion | 100 | Δ | X |
| | 29 n-hexane | 100 | immersion | 50 | X | X |
| | 30 Diethyl ether | 100 | immersion | 30 | X | X |
| | 31 Methylene chloride | 100 | immersion | 40 | Δ | X |
| | 32 Toluene | 100 | immersion | 50~100 | ○*2 | Δ*2 |

*1 melamine-acrylic thermosetting resin paint/primer resin/polyolefin resin substrate
The chemical compositions of resin paint and primer resin are different between the resin parts I and II.
*2 Swelling or partly dissolving of polyolefin resin part

EXAMPLE 63-66, COMPARATIVE EXAMPLES 33-34

Each of the stripping composition shown in Table 4 was sprayed onto the resin parts under conditions shown in Table 4 to evaluate the state of removing the resin paint material in the same manner as described above. The results are shown in Table 4.

TABLE 4

| | Successional spray application system | State of removing resin paint film |
|---|---|---|
| Example 63 | ($A_1/B_1$ = 50/50) spraying (room temperature/3 minutes) → heat treatment (80° C./15 minutes) → drying (60° C./7 minutes) | Δ~○ |
| Example 64 | ($C_1/B_1/B_2$ = 20/70/10) spraying (room temperature/3 minutes) → heat treatment (80° C./15 minutes) → drying (60° C./5 minutes) | Δ~⊚ |
| Example 65 | ($A_1/B_2/C_2$ = 10/60/30) spraying (room temperature/3 minutes) → heat treatment (80° C./15 minutes) → drying (60° C./5 minutes) | Δ~⊚ |
| Example 66 | $A_2$ spraying (room temperature/3 minutes) → ($C_2/B_1/B_2$ = 30/60/20) spraying (room temperature/3 minutes) → heat treatment (60° C./15 minutes) → drying (60° C./5 minutes) | Δ~⊚ |
| Comparative Example 33 | ($A_1/B_1$ = 50/50) spraying (room temperature/3 minutes) → heat treatment (40° C./15 minutes) → drying (60° C./5 minutes) | X |
| Comparative Example 34 | ($C_1/B_1/B_2$ = 20/70/10) spraying (room temperature/3 minutes) → heat treatment (40° C./15 minutes) → drying (60° C./5 minutes) | X |

Note)
$A_1$: formamide
$A_2$: methyl ethyl ketone
$B_1$: ethanol
$B_2$: water
$C_1$: sodium thiocyanate
$C_2$: calcium thiocyanate
Δ: partly swelling/peeling/decomposition
○: peeling of solid color resin or primer resin
⊚: decomposition of solid color resin or primer resin As mentioned above, the particular stripping compositions according to the invention are sprayed or applied onto the resin painted resin parts or immersed therewith, whereby only the pain resin can chemically be decomposed and dissolved into the composition to efficiently remove the resin paint material without degrading the environment hygiene and causing the breakage of ozone layer.

What is claimed is:

1. A method of removing resin paint material, which comprises spraying or applying a stripping composition comprising 8-65% by weight of thiocyanate represented by the following formula:

$$M(S{=}C{=}N)_n$$

wherein M is an alkali metal ion (Group 1A), an alkaline earth metal ion (Group 2A), or a quaternary ammonium ion having an ionic value of n, 10-85% by weight of an alcohol having a boiling point under atmospheric pressure of not higher than 100° C., and 5-60% by weight of water onto a resin part coated with a resin paint at a temperature of room temperature to 160° C., or immersing the resin parts into said tripping composition at this temperature.

2. The method according to claim 1, wherein said temperature is within a range of 50°-100° C.

3. The method according to claim 1, wherein said alcohol is selected from the group consisting of a monool represented by the following formula:

$$R_2{-}OH$$

wherein $R_2$ is $C_nH_{2n+1}$ or an aromatic group and n is an integer of 1-10; a diol represented by the following formula:

$$HO{-}R_3{-}OH$$

wherein $R_3$ is $C_nH_{2n}$ or an aromatic group and n is an integer of 2-10; a triol represented by the following formula:

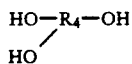

wherein $R_4$ is $C_6H_{11}$ or $C_7H_{13}$; and a tetraol represented by the following formula:

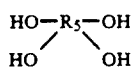

wherein $R_5$ is $C_nH_{2n+1}$ and n is an integer of 4-5.

4. The method according to claim 1, wherein said composition comprises 10-40% by weight of said thiocyanate, 20-60% by weight of said alcohol and 10-30% by weight of water.

* * * * *